United States Patent Office 3,840,588
Patented Oct. 8, 1974

3,840,588
PRODUCTION OF UNSATURATED ESTERS
Anthony J. C. Pearson, Maryland Heights, Mo., assignor to Monsanto Company, St. Louis, Mo.
Filed Aug. 3, 1972, Ser. No. 277,721
Int. Cl. C07c 69/54
U.S. Cl. 260—486 D
6 Claims

ABSTRACT OF THE DISCLOSURE

This invention relates to improvements in a process for production of $\alpha$-$\beta$ ethylenically unsaturated esters via the vapor phase condensation of formaldehyde and saturated alkyl carboxylates. The said process is preferably carried out at temperatures of from 400° C. to 600° C., in the presence of a catalyst, consisting of a Group IA metal compound associated with a silica gel support and having a specific surface area of from 350 to 1000 m.$^2$ gm.$^{-1}$.

---

Figure 1:
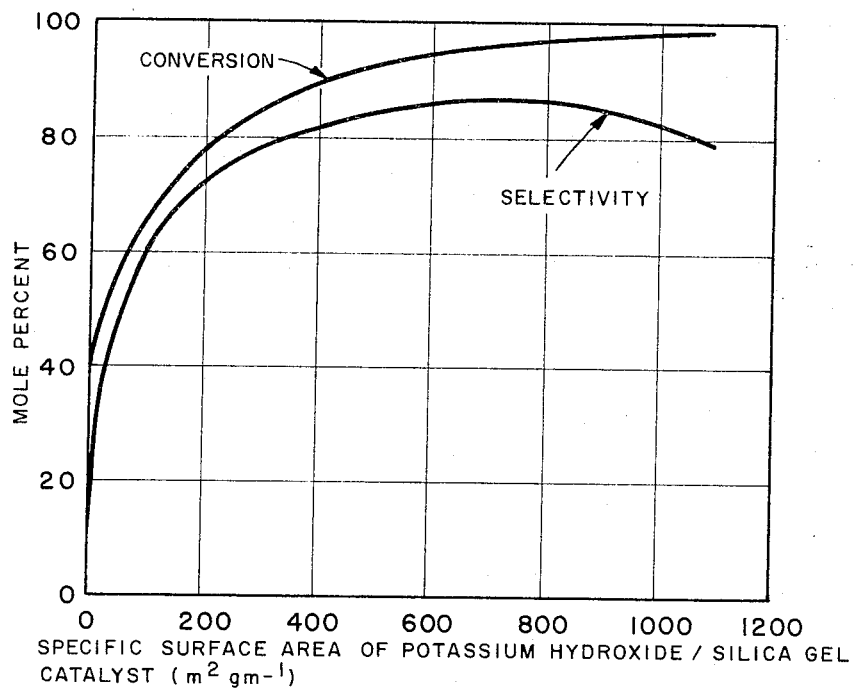

This invention relates to improvements in a process for the production of $\alpha$-$\beta$ ethylenically unsaturated esters by the vapor phase reaction of formaldehyde and saturated alkyl carboxylates.

In a particular aspect, this invention relates to a high temperature process which has been found to lead to improved selectivity with respect to desirable unsaturated esters, and with a repression of by-products.

In a further aspect, this invention relates to the production of $\alpha$-$\beta$ ethylenically unsaturated esters by the vapor phase reaction of formaldehyde and a saturated carboxylic ester, for example, the production of methyl methacrylate utilizing formaldehyde and methyl propionate.

$\alpha$-$\beta$ unsaturated esters, especially methyl acrylate, methyl methacrylate and ethyl acrylate, are used extensively in the manufacture of a wide group of polymeric materials, for example as surface coatings and as transparent panels used as windows. Such esters have been synthesized by the catalytic vapor phase reaction of an alkyl ester and formaldehyde. Typical materials which are known to catalyze the said vapor phase reaction include alkali and alkaline earth metal hydroxides, oxides or alkanoates supported on alumina, alkaline or alkaline earth aluminosilicates, alkali or alkaline earth hydroxides supported on silica gel. However, the processes of the prior art suffer from serious disadvantages which are greatly minimized in the processes of the present invention.

Representative patents in the prior art are U.S. Pats. 3,089,898 to 3,089,902, issued to J. F. Vitcha et al., but these processes are inferior to the improved processes of the present invention. Quite unexpectedly it has been found that alkaline catalysts of unusually high surface area, preferably having a specific surface area of 350 to 1000 m.$^2$ gm.$^{-1}$, perform in a much superior manner for the present process with respect to conversion and selectivity relative to conventional catalysts. For example when a silica gel is used as a commercial catalyst support it typically has a specific surface area of around 300 m.$^2$ gm.$^{-1}$. In direct contrast the novel catalyst systems of the present invention utilize silica gels which have specific surface areas as high as 1000 m.$^2$ gm.$^{-1}$. The improved catalyst formulation has several quite unexpected effects. Whereas in the prior art typical temperatures of operation fall in the range 325° C. to 425° C., the preferred temperature range for the processes of the present invention unexpectedly are 400° C. to 600° C., but more preferably 430° C. to 500° C.

The combined effect of the novel, improved catalyst system, and higher preferred temperatures of the present invention is that feed dilution mole ratios (ratio of saturated alkyl carboxylate to formaldehyde) considerably lower than used in the prior art may be employed in the processes of the present invention. The use of lower saturated ester to formaldehyde ratios is a significant improvement over the prior art and thus provides improved and more economically and commercially feasible processes with far less recycle of expensive components and simpler purification. Moreover, the improved catalysts of the present invention result in improved selectivities at the preferred temperatures in comparison with selectivities obtained at the temperature ranges quoted in the prior art.

A further improvement has also been found to result from strict control of the water content of the reaction system, a parameter not recognized by previous workers in this field. It is preferable to maintain water content in the feed such that the mole ratio of water to formaldehyde is from 0.01 to 10.0, but more preferably 0.1 to 5.0. In the case of the reaction of saturated ester of general formula $RCH_2COOR'$ with formaldehyde (where in general R contains 2 to 8 carbon atoms and R' contains 1 to 8 carbon atoms) improved performance has also been achieved by the use of an alkanol diluent R'OH, such that the feed mole ratio of lower alkanol to formaldehyde is within the range 0.1:1 to 20:1, but more preferably from 2:1 to 10:1. The use of the lower alkanol as diluent has been found to serve several purposes. Its use allows a considerably lower feed mole ratio of alkyl carboxylate to formaldehyde, hence reducing the amount of the more expensive ester in recycle streams. Secondly the presence of alkanol, at the feed mole ratios specified, inhibits the undesirable hydrolysis of the feed and product esters. The alkanol diluent remains unchanged at the end of the process and is easily recovered substantially unreacted, and is readily recycled.

An object of the present invention is to provide improvements in the vapor phase process for the production of $\alpha$-$\beta$ ethylenically unsaturated esters by the condensation of formaldehyde with saturated alkyl carboxylates.

It is another object of this invention to provide an improved process as above in which the aforesaid vapor phase reaction is effected using approximately equimolar quantities of formaldehyde and a saturated alkyl carboxylate, in the presence of catalytic amounts of Group IA alkali metal hydroxides or oxides, but preferably of potassium, rubidium or cesium with potassium being most preferred.

In addition to hydroxides or oxides, other alkali metal compounds may be used when preparing the catalyst. These compounds can be applied to the catalyst support as carbonates, nitrates, sulphates, phosphates, and other inorganic salts or acetates, propionates or other carboxylates. Alkaline earth metal compounds may also be used if desired, e.g., calcium, magnesium and barium compounds.

It is a further object of this invention to provide an improved process for the production of $\alpha$-$\beta$ ethylenically unsaturated esters by the condensation of formaldehyde with alkyl carboxylates as described above in approximately equimolar quantities in the presence of catalytic amounts of potassium hydroxide or oxide and the other alkaline compounds on silica or silica gel, as preferred carriers.

The improved process of the present invention has been found to result from the use of novel catalysts having high specific surface areas (as measured by the BET method, e.g. S. Brunauer, et al. JACS, 60, 309 (1938)). In general, silicas and silica gels when used as catalyst supports in typical catalytic processes have specific surface areas in the range of a fraction of 1 meter$^2$ gm.$^{-1}$ to around 300 meter$^2$ gm.$^{-1}$. In contrast to this, it has been found that high area silicas and silica gels are preferable supports for this process. Catalysts having surface areas preferably in the range of 350 to 1000 meter$^2$ gm.$^{-1}$ have been found to give results superior to prior practice. This quite unexpected finding is demonstrated graphically in the FIG. 1 herewith. It can be clearly seen that optimum conversion and selectivity are obtained from the use of potassium hydroxide/silica gel catalysts of unusually high specific surface areas.

Although the high area silica gels and silicas are the preferred solid catalyst supports for the processes of the present invention, the high area aluminas, silica-aluminas, thorias, magnesias, silicates and other such materials known to those skilled in the art may also be used.

Figure 2:
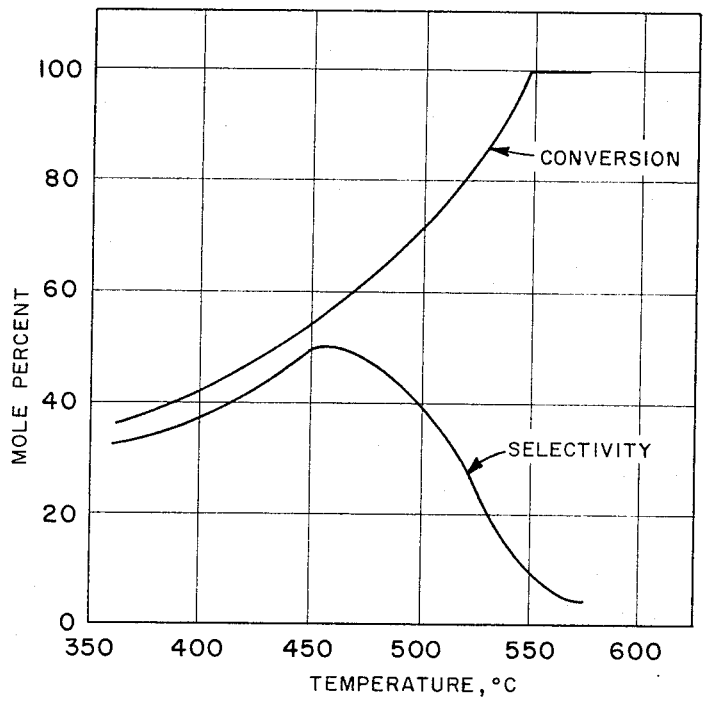

Further improvements of the present invention have been found to result from the use of reaction temperatures which are higher than those which have been employed by previous workers in this field. Since the reaction of formaldehyde and alkyl carboxylates is carried out in the vapor phase, the temperature employed must be sufficient to maintain the reactants in the vapor phase, and at which reaction occurs, but should not exceed temperatures at which substantial decomposition of the particular reactants and reaction products occurs. Whereas in the prior art typical temperatures of operation fall in the range 325° to 425° C., the preferred temperatures for the process of the present invention unexpectedly are 400° to 600° C. and more preferably 430° to 500° C. FIG. 2 herewith demonstrates the desirability of the high temperature operation. It has been found that the use of higher temperatures greatly improves the selectivity of the process towards the production of the desired unsaturated products while avoiding competing reactions such as the disproportionation of formaldehyde to formic acid and methanol (Cannizzaro reaction).

It is a principal advantage of the present invention over the prior art that high conversion and selectivity can be maintained while employing lower feed mole ratios of saturated alkyl carboxylate to formaldehyde. In the present process it is found that ratios of alkyl carboxylate to formaldehyde of from 0.1:1 to 7.5:1, but more preferably 1.0 to 5.0 may be employed. The use of lower saturate to formaldehyde mole ratios of a significant improvement over the prior art as in commercial operation this improvement allows more economical operation with less recycle and simplified purification requirements.

A further improvement of the present invention is the unexpected discovery that water concentration plays an important role in the control of selectivity and conversion. It has been found that under completely anhydrous conditions the reaction proceeds at a negligible rate. At high molar feed ratios of water to formaldehyde, e.g. 15 to 1, poor selectivities result. Desirable water to formaldehyde ratios are in the range 0.01:1 to 10:1, but more preferably 0.1:1 to 5.0:1.

The present reaction is conducted in the presence of an alcohol, R'OH, preferably having from 1 to 8 carbon atoms. The alcohol aids in repressing the hydrolysis of the ester feed and also in reducing the required amount of ester in the feed by acting as a diluent. It is generally preferable to utilize from about 0.1:1 to 20:1 moles of alcohol for each mole of formaldehyde in the feed, but more preferably about 2:1 to 10:1 moles of alcohol per mole of formaldehyde.

A first embodiment of the present invention is to provide an improved process for the production of α-β ethylenically unsaturated esters by the vapor phase condensation of formaldehyde with a saturated alkyl carboxylate over a catalyst comprising a Group I-A compound dispersed on a solid carrier. The said improvement consists of employing a catalyst of high specific surface area, preferably of from 350 to 1000 m.$^2$ gm.$^{-1}$; of operating at a temperature of 400° to 600° C., but more preferably 430° to 500° C.; of using feed mole ratio of water to formaldehyde of from 0.01:1 to 10:1, but more preferably 0.1:1 to 5:1; of employing a feed mole ratio of carboxylic acid to formaldehyde of from 0.1:1 to 7.5:1, but more preferably 1:0:1 to 5.0:1, and of employing a feed mole ratio of lower alkanol to formaldehyde of from 0.1:1 to 20:1, but more preferably 2:1 to 10:1. The reaction may be represented by the following overall equation:

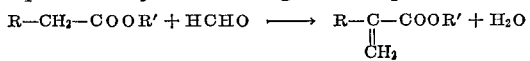

in which R represents hydrogen or an alkyl, aryl or cyclic radical; R' represents a lower alkyl radical.

Another embodiment of the present invention is directed to the process of the first embodiment in which catalytic amounts of potassium hydroxide or other Group I-A compounds are supported on silica gel, alumina, silica-alumina, thoria, magnesia or other catalyst carriers. The potassium or other alkali content of the catalyst, calculated as the hydroxide is preferably in the range of 0.01 to 10 weight percent of the complete catalyst.

As set forth above, the said saturated alkyl carboxylates used in the process of the present invention are converted to α-β ethylenically unsaturated esters by reaction with formaldehyde. Suitable saturated alkyl carboxylates contain a minimum of three carbon atoms per molecule and may be represented by the formula

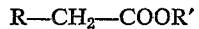

wherein R represents hydrogen or an alkyl, aryl or cyclic radicals of 0 to 13, or preferably 0 to 6 carbon atoms, and R' represents a lower alkyl radical of 1 to 8 carbon atoms. For the purpose of the present invention the term "alkyl radical" is taken to mean a radical containing a sufficiently low number of carbon atoms, such that the alkyl carboxylate and product unsaturated ester will be readily vaporizable without substantial decomposition. Representative alkyl carboxylates suitable for use in this invention include methyl acetate, ethyl acetate, methyl propionate, ethyl propionate, methyl n-butyrate, the methyl ester of phenyl acetic acid, etc. In general the alkyl carboxylates contain at least 3, and preferably 3 to 23 carbon atoms, although carboxylates containing a greater number of carbon atoms may also be used if desired. The lower alkanol diluent used with the alkyl carboxylate R—CH$_2$—COOR' is that alcohol which the feed carboxylate yields on hydrolysis, R'OH. Representative lower alkanols are methanol, ethanol, isopropanol, ethyl hexanol, etc. In general, alcohols containing from 1 to 8 carbon atoms per molecule are preferred, although higher alcohols may be employed if desired.

The formaldehyde used in the present invention can be of any convenient form. For example, it can be anhydrous paraformaldehyde, trioxane or in the form of an aqueous or alcoholic solution as are available commercially. If desired, the process may be coupled directly with a process for the manufacture of formaldehyde or its polymers.

The process of the present invention may be conveniently practiced at atmospheric pressure. However, if it is desired, subatmospheric pressures of superatmospheric pressures may be utilized. Generally, suitable pressures are in the range of from about 1 to about 100 p.s.i.a. The space velocity is preferably maintained within the range of 100 to 10,000 litres hr.$^{-1}$ litre of catalyst$^{-1}$.

The reaction is conducted in the vapor phase in the presence of a solid catalyst as has been described. The solid catalyst may be charged to a tube or on trays or in a fluid bed, etc. through which the reactant mixture is passed. The reactor system may consist of a series of catalyst beds with optional interstage heating or cooling between the beds if desired. The catalyst composition may be varied through the reactor to provide operating advantages. It is also an embodiment of the invention to use either upflow or downflow of the reactants through the reactor, with periodic reversal of gas flow also being contemplated to maintain a clean catalyst bed. If desired the gaseous feed may be charged together with an inert carrier gas, e.g. nitrogen, helium, argon, carbon oxides or low molecular weight hydrocarbons.

The following examples illustrate representative embodiments of the invention, but are not limitative of the scope of the invention.

EXAMPLE 1

A catalyst for the condensation of formaldehyde with methyl propionate is prepared in the following manner: 101 gm. of silica gel (18 to 35 mesh), having a specific surface area of 600 meter$^2$ gm.$^{-1}$ is calcined in a furnace for 4 hours at 500° C. The silica gel is then cooled in a desiccator and then 100 gm. is charged to a rotary evaporator. A solution containing 0.75 gm. KOH is prepared by diluting 1.65 gm. of 45.5% KOH solution to 60 ml. The KOH solution is introduced to the agitating catalyst support and the admixture is dried until free flowing at 26″ Hg vacuum at 90° C. The impregnated catalyst support is then further dried for 2 hours at 120° C., calcined at 500° C. for 8 hours and then cooled and stored in a desiccator.

A mixture containing methyl propionate, formaldehyde, water and methanol is prepared and charged to a feed tank and is stored under a positive pressure of nitrogen. The said mixture has a composition such that the mole ratio of methyl propionate to formaldehyde is 4.5:1; and the mole ratio of water to formaldehyde is 5.3:1; and the mole ratio of methanol to formaldehyde is 6.7:1. The said mixture is pumped by means of a metering pump to a vaporizer maintained at 225° C. where it is vaporized and mixed with a nitrogen sweep gas which is flowing at 20 std. cm.$^3$/min.$^{-1}$. The combined feed mixture is passed through a heated line to a tubular reactor whose temperature is controlled at 430° C. The reaction tube contains a 10 cm.$^3$ aliquot of the above catalyst. The vaporized feed mixture which has a flow rate of 906 litre hr.$^{-1}$ litre of catalyst$^{-1}$ is passed over the said catalyst. The reactor effluent is condensed and analyzed by gas chromatography. The analysis indicates 67% of the formaldehyde in the feed to have been consumed over the catalyst and methyl methacrylate to have been formed at a selectivity of 92% based on formaldehyde consumed. No hydrolysis of methyl propionate to propionic acid is evident. Analysis of non condensables by gas chromatography indicates the presence of trace amounts of carbon monoxide, carbon dioxide and hydrogen in the nitrogen sweep gas. When the potassium hydroxide component of the catalyst is replaced by lithium, sodium, rubidium or cesium hydroxides, or carbonates, similar results are obtained. Supports such as alumina, silica-alumina, of high surface area give like results.

EXAMPLE 2

In this example, it is demonstrated that high temperatures are desirable. The procedure of Example 1 is employed, but using a catalyst composed of 0.5% potassium hydroxide deposited on a silica gel and with a specific surface area of 600 meter$^2$ gm.$^{-1}$. The feed rate is 963 litre hr.$^{-1}$ litre of catalyst$^{-1}$, corrected to STP. Temperatures in the range 350° C. to 600° C. are investigated. The feed used has a composition such that the mole ratio of methyl propionate to formaldehyde is 3.8:1; the mole ratio of water to formaldehyde is 2.0:1 and the mole ratio of methanol to formaldehyde is 5.6:1. Several typical results are shown in Table I herewith, where MMA is methyl methacrylate and PA is propionic acid.

Similarly, the shapes of the curves for conversion and selectivity versus temperature are of the same general shape for other catalyst compositions and feed mole ratios. Although the curve shapes are similar, the absolute values may vary, e.g. at feed mole ratio of 4.8 moles water per mole formaldehyde, and a catalyst comprising 1.0% KOH$_2$ dispersed on a silica gel of 800 m.$^2$ mg$^{-1}$, but other conditions remaining the same it is found that temperature has a similar effect but selectivities as high as 95 mole percent are obtained at 450° C.

TABLE I

| Temperature, °C. | Conversion of HCHO, mole percent | Selectivity to MMA, mole percent | By-product selectivity to PA, mole percent |
|---|---|---|---|
| 425 | 49 | 45 | 0.3 |
| 450 | 56 | 50 | 0.5 |
| 475 | 61 | 47 | 0.9 |

EXAMPLE 3

The effect of surface area of the catalyst is shown in the present example. The procedure of Example 1 is employed, but using a series of catalysts composed of 1% by weight potassium hydroxide on silica gel with specific surface areas in the range of 2.4 to 1000 meter$^2$ gm.$^{-1}$. In the present example the feed has a composition such that the mole ratio of methyl propionate to formaldehyde is 10.2:1; the mole ratio of water to formaldehyde is 0.4:1; and the mole ratio of methanol to formaldehyde is 0.6:1. The reactor temperature is maintained at 400° C. and the pressure is 14.8 p.s.i.a. Table II herewith summarizes the results for each catalyst, with the specific surface areas shown below.

TABLE II

| Run No. | Catalyst area, m.$^2$gm.$^{-1}$ | Space velocity, L hr.$^{-1}$ L$^{-1}$ | Conversion, mole percent | Selectivity, mole percent |
|---|---|---|---|---|
| 1 | 2.4 | 500 | 65 | <1 |
| 2 | 40 | 460 | 55 | 48 |
| 3 | 131 | 500 | 72 | 68 |
| 4 | 315 | 490 | 86 | 78 |
| 5 | 600 | 510 | 94 | 86 |
| 6 | 800 | 490 | 97 | 86 |
| 7 | 1,010 | 490 | 98 | 82 |

The hydrolysis of methyl propionate to propionic acid is less than 0.05 moles/mole of methyl propionate for each catalyst. The effects of catalyst surface area upon conversion and selectivity are shown in FIG. 1 herewith.

EXAMPLE 4

The effect of the ratio of methanol diluent relative to formaldehyde and the ratio of water to formaldehyde is shown in this example. The procedure of Example 1 is followed, using feed space velocity of 700–800 litre hr.$^{-1}$ of catalyst$^{-1}$, corrected to STP. The catalyst in this example contains 1.0% by weight of potassium hydroxide which has been deposited on a silica gel and has a specific surface area of 800 m.$^2$ gm.$^{-1}$. The data is summarized in Table III where MePr is methyl propionate, MeOH is methanol, MMA is methyl methacrylate, PA is propionic acid.

From the experimental results it can be seen that water concentration unexpectedly is a most important parameter. In Run 3, under anhydrous conditions, formaldehyde conversion is negligible. In Run 7 at H$_2$O/HCHO=15:1, although conversion is 100%, there is a poor selectivity, namely 33 mole percent, to the desired product methyl methacrylate. In contrast Runs 4, 5 of intermediate water level give rise to results of much superior selectivity levels.

A comparison relative to Run 1, whose conditions are typical of those of the prior art, with Run 2, whose conditions are in the preferred ranges for the present invention, indicates that the present invention yields improved performance with respect to selectivity to desired product, reduced side reaction and lower alkyl carboxylate to formaldehyde ratio.

EXAMPLE 5

A mixture containing ethyl acetate, formaldehyde, water and ethanol is prepared and the procedure of Example 1 is employed, but with a catalyst comprising 1.0% by weight potassium hydroxide deposited on a silica gel, the said catalyst having a specific surface area of 750 meter$^2$ gm.$^{-1}$. The feed mixture is of a composition such that the mole ratio of ethyl acetate to formaldehyde is 4.7:1, the mole ratio of water to formaldehyde is 0.6:1, and the mole ratio of ethanol to formaldehyde is 5.7:1. Analysis of the condensed reaction product shows that 72% of the formaldehyde in the feed has been consumed. No hydrolysis of ethyl acetate to acetic acid is evident. Table IV herewith shows the products produced across the catalyst when several different feed esters and alcohols are used in place of ethyl acetate and ethanol. The 2-ethylhexyl acrylate product is useful as a component of surface coatings and water-dispersible paints.

TABLE III

| Run No. | Temperature, °C. | Feed, mole ratios | | | Conversion of HCHO, mole percent | Selectivity to MMA, mole percent | By-product selectivity to PA, mole percent |
|---|---|---|---|---|---|---|---|
| | | MePr HCHO | MeOH HCHO | H$_2$O HCHO | | | |
| 1 | 400 | 10.6 | 0.6 | 0.4 | 97 | 82 | 5 |
| 2 | 440 | 4.1 | 5.9 | 0.4 | 97 | 86 | 0 |
| 3 | 400 | 5.0 | 5.0 | 0 | 0.1 | --- | 7 |
| 4 | 400 | 5.3 | 0.5 | 5.3 | 91 | 71 | 5 |
| 5 | 400 | 3.7 | 7.5 | 1.0 | 47 | 89 | 0 |
| 7 | 400 | 5.0 | 5.0 | 15.0 | 100 | 33 | 11 |

TABLE IV

| Feed | Product |
|---|---|
| Methyl n-butyrate, formaldehyde, water, methanol. | Methyl α-ethylacrylate. |
| 2-ethylhexylacetate, formaldehyde, water, 2-ethylhexanol. | 2-ethylhexyl acrylate. |
| n-Butyl propionate, formaldehyde, water, n-butanol. | n-Butyl methacrylate. |
| Methyl acetate, formaldehyde, water, methanol. | Methyl acrylate. |

What is claimed is:

1. In an improved process for the vapor phase production of α-β ethylenically unsaturated esters by the condensation of formaldehyde with a saturated alkyl carboxylate, R—CH$_2$—COOR' where R is hydrogen, alkyl, aryl or cyclic radicals of 0 to 13 carbon atoms, and R' is a lower alkyl radical of 1 to 8 carbon atoms, over a catalyst consisting essentially of a compound of potassium, rubidium or cesium, dispersed on a solid carrier, the improvements comprising the following conditions:
    (a) the said catalyst having a specific surface area, of from 350 to 1000 m.$^2$ gm.$^{-1}$.
    (b) a temperature of operation of from 400° to 600° C.
    (c) a feed mole ratio of alkyl carboxylate to formaldehyde in the range 0.1:1 to 7.5:1.
    (d) a feed mole ratio of water to formaldehyde in the range of 0.01:1 to 10.0:1.
    (e) a diluent feed mole ratio of lower alkanol, R'OH, to formaldehyde of 0.1:1 to 20:1.

2. In an improved process for the vapor phase production of α-β ethylenically unsaturated esters by the condensation of formaldehyde with a saturated alkyl carboxylate, R—CH$_2$—COOR' where R is hydrogen, alkyl, aryl or cyclic radicals of 0 to 13 carbon atoms, and R' is a lower alkyl radical of 1 to 8 carbon atoms, over a catalyst consisting essentially of a compound of potassium, rubidium or cesium, dispersed on a solid carrier, the improvements comprising the following conditions:
    (a) the said catalyst having a specific surface area, of from 350 to 1000 m.$^2$ gm.$^{-1}$.
    (b) a temperature of operation of from 430° to 500° C.
    (c) a feed mole ratio of alkyl carboxylate to formaldehyde in the range 1.0:1 to 5.0:1.
    (d) a feed mole ratio of water to formaldehyde in the range of 0.1:1 to 5.0:1.
    (e) a diluent feed mole ratio of lower alkanol, R'OH to formaldehyde of 2.0:1 to 10:1.

3. Process as in Claim 1 to produce methyl methacrylate in which the said alkyl carboxylate is methyl propionate.

4. Process as in Claim 1 to produce methyl acrylate in which the said alkyl carboxylate is methyl acetate.

5. Process as in Claim 1 in which the said catalytic compound is potassium hydroxide.

6. Process as in Claim 1 in which the said catalyst consists essentially of potassium hydroxide dispersed on silica gel.

References Cited
FOREIGN PATENTS
785,100 10/1957 Great Britain ____ 260—486 R

OTHER REFERENCES
C. H. COLLIER: Catalysts in Practice, pp. 11–17, 1957.

LORRAINE A. WEINBERGER, Primary Examiner

P. J. KILLOS, Assistant Examiner

U.S. Cl. X.R.
252—454; 260—468 L, 469, 476 R